July 2, 1968

T. L. FAWICK 3,390,744

SELF-ENERGIZING DISC BRAKE

Filed Oct. 19, 1966

INVENTOR.
THOMAS L. FAWICK
BY
YOUNT, RANEY, FLYNN & TAROLLI

ATTORNEYS

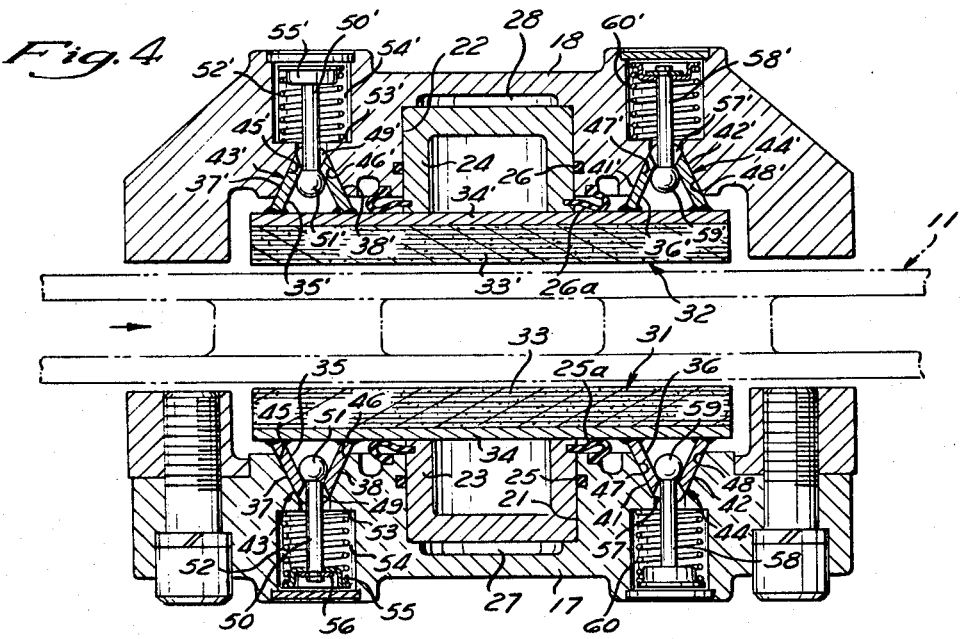
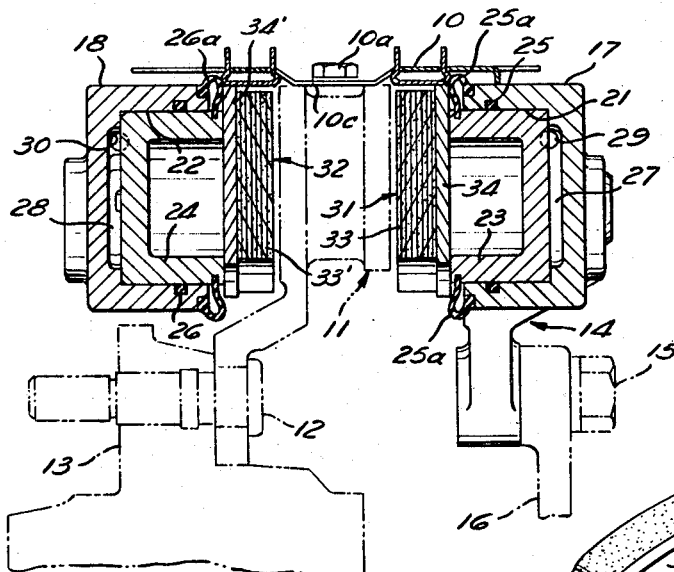
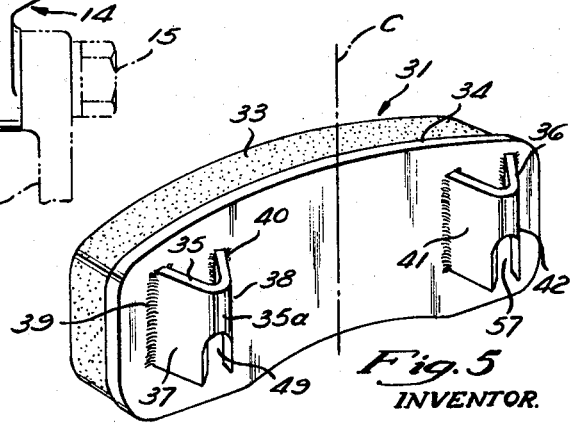
INVENTOR.
THOMAS L. FAWICK
BY
YOUNT, RANEY, FLYNN, & TAROLLI
ATTORNEYS United States Patent Office 3,390,744
Patented July 2, 1968

3,390,744
SELF-ENERGIZING DISC BRAKE
Thomas L. Fawick, Shaker Heights, Ohio
(% Hotel Statler-Hilton, Cleveland, Ohio 44101)
Filed Oct. 19, 1966, Ser. No. 587,850
7 Claims. (Cl. 188—73)

ABSTRACT OF THE DISCLOSURE

The present disc brake has a housing with a pair of circumferentially-spaced recesses facing toward one axial side of the brake disc and each having opposite side faces which slope toward the brake disc at opposite 65° angles, and a frictional wear shoe with a pair of lugs received in these recesses and each having correspondingly sloped side faces for sliding engagement with the side faces of the respective recess to provide self-energizing braking for either direction of rotation of the brake disc. A fluid-operated piston engages the wear shoe midway circumferentially between its lugs. Preferably, a similar arrangement of housing recesses, wear shoe lugs and fluid-operated piston is provided on the opposite axial side of the brake disc.

---

This invention relates to a self-energizing disc brake.

Various spot-type disc brakes have been proposed heretofore in which a fixedly mounted caliper-type housing straddles a portion of the periphery of a rotatable brake disc and provides a stationary "limb" on each side of the disc. Commonly, each limb of the caliper-type housing carries one or more cylinders, each receiving a piston for forcing a respective frictional wear shoe into engagement with that side of the brake disc near its periphery.

In many brakes of this general type, the frictional wear shoe has an appreciable extent circumferentially of the brake disc. Where only a single piston is used with such a circumferentially elongated wear shoe the wear shoe has a tendency to cock or pivot when it is forced into frictional engagement with the brake disc. To overcome this tendency it has been proposed to provide two or more pistons at different circumferential locations along each wear shoe, so that the brake-applying force on the wear shoe is distributed more evenly over its circumferential extent. The provision of such a multiple piston actuating mechanism for each wear shoe increases the expense of the brake and has other disadvantages.

The present invention is directed to a novel arrangement in a disc brake which overcomes these difficulties and disadvantages, enabling the use of a single piston for actuating each circumferentially elongated wear shoe and at the same time avoiding the tendency for the wear shoe to tilt or cock when the brake is applied.

In accordance with the present invention the wear shoe and the housing limb at that side of the brake disc are provided with confronting inclined surfaces on opposite sides circumferentially of the centerline of the wear shoe for sustaining the braking torque. These inclined surfaces permit the wear shoe to slide circumferentially with respect to the housing in the direction of rotation of the brake disc for self-energizing braking engagement with the disc when the brake is applied. Preferably, these slidably-engageable torque sustaining surfaces are provided by recesses in the housing limb and projecting lugs on the wear shoe which are received in these recesses. Preferably, also, such inclined surfaces are provided for each direction of rotation of the brake disc, so that the braking action is self-energizing in either direction.

It is a principal object of this invention to provide a novel and improved disc brake construction which provides self-energizing braking.

Another object of this invention is to provide such a disc brake construction which enables the use of a single piston-and-cylinder for operating each wear shoe and overcomes in a novel and simplified manner any tendency of the wear shoe to cock or tilt when the brake is applied.

Another object of this invention is to provide such a disc brake construction in which the brake-applying force is distributed substantially uniformly across the wear shoe, even though only a single cylinder-and-piston is provided for actuating the wear shoe.

Another object of this invention is to provide such a disc brake construction in which the wear shoe may be readily inserted or removed in a novel and advantageous manner.

Further objects and advantages of this invention will be apparent from the following detailed description of a presently-preferred embodiment thereof, which is illustrated in the accompanying drawings.

In the drawings:

FIGURE 3 is a fragmentary radial section through the center of this brake, taken along the line 3—3 in FIG. 1;

FIGURE 4 is a longitudinal section taken along the line 4—4 in FIG. 1; and

FIGURE 5 is a perspective view of a frictional wear shoe in the present brake.

Figure 2:
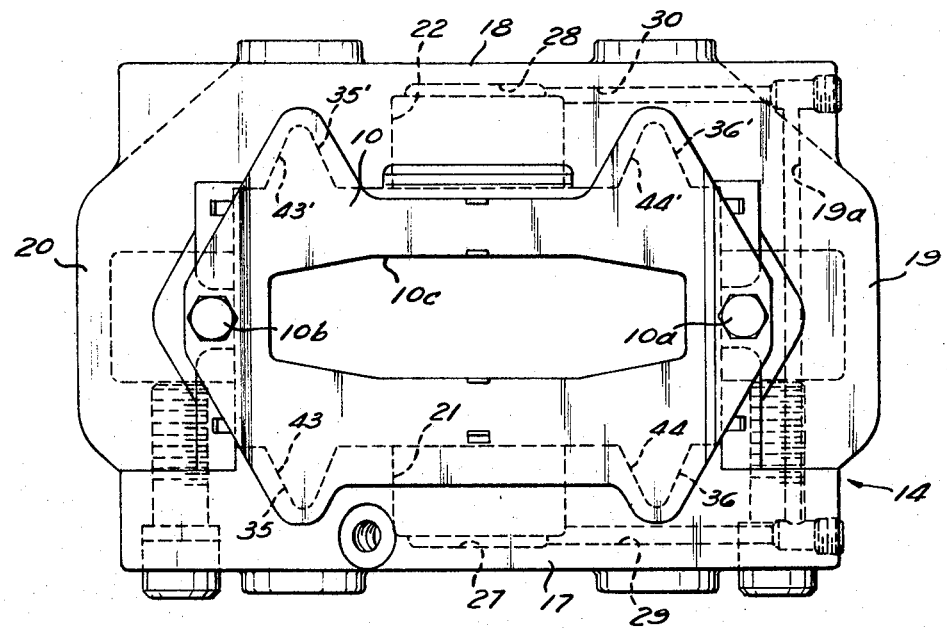
FIGURE 2 is a top plan view of the FIG. 1 brake.
Figure 1:
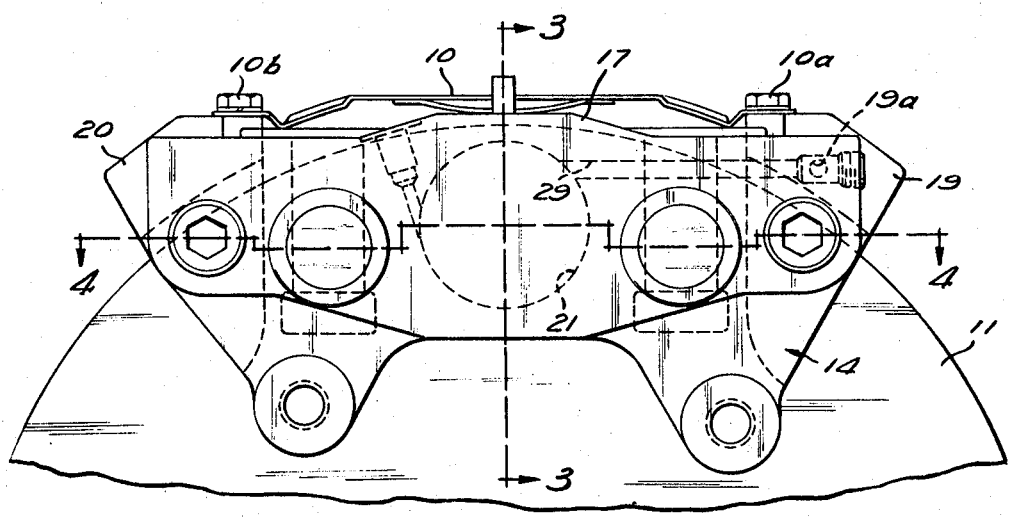
FIGURE 1 is a fragmentary end elevational view of a disc brake in accordance with the present invention.

Referring to FIGS. 1 and 3, the present brake includes a rotatable brake disc 11 which is mounted to rotate in unison with the wheel of a passenger car or other vehicle, such as by being attached by bolts 12 (FIG. 3) to a radial flange on the hub 13 of the wheel. The brake also has a rigid caliper-type housing 14 which is attached by bolts 15 to a non-rotating part 16 of the vehicle wheel assembly. As shown in FIG. 2, this housing presents opposite limbs 17 and 18, which are fixedly positioned on opposite axial sides of the brake disc 11. These housing limbs are rigidly interconnected by circumferentially spaced bridging segments 19 and 20 (FIG. 1) extending across the periphery of the brake disc at the opposite circumferential ends of the housing. A sheet metal cover plate 10 is attached by bolts 10a and 10b to the respective bridging segments 19, 20 of the housing. As shown in FIG. 2, this cover plate has an elongated central opening 10c which facilitates the flow of air through the brake disc.

In the particular embodiment shown, the opposite limbs of the caliper-type housing present respective cylinders 21 and 22 which are in alignment axially opposite one another. Each of these cylinders is located midway along the length of the caliper housing circumferentially of the brake disc. These cylinders slidably receive respective pistons 23 and 24 (FIGS. 3 and 4) and they carry respective sealing rings 25, 26 engaging the peripheries of the respective pistons. Annular flexible diaphragms 25a and 26a engage the inner ends of cylinder 21 and piston 23, and cylinder 22 and piston 24, respectively. The cylinder chambers 27 and 28 behind the respective pistons preferably are interconnected by longitudinal passages 29 and 30 (FIG. 2) in the respective caliper limbs 17 and 18 and a cross passage 19a in the bridging segment 19 of the housing, and a suitable arrangement (not shown) is provided for applying fluid pressure at these chambers against the pistons in response to the operation of the brake pedal on the vehicle and for releasing this fluid pressure when the brake pedal is released.

The brake also has a pair of circumferentially elongated frictional wear shoes 31 and 32 (FIGS. 3–5) located between each respective limb of the caliper-type housing and the adjacent side face of the brake disc 11. The wear shoe 31 will be described in detail, and it is to be understood that the other wear shoe 32 is identical to it.

As shown in FIGS. 3–5, the wear shoe 31 has a pad 33 of suitable friction material for engagement with the brake disc and attached to a rigid metal backing plate 34 which is slidably engaged by the inner end of the corresponding piston 23. The backing plate 34 may be a one-piece casting or it may be of pressed steel.

In accordance with the present invention, the backing plate 34 of the wear shoe is provided with a pair of rearwardly projecting, tapered V-shaped lugs 35 and 36 (FIGS. 4 and 5), which are located on opposite sides circumferentially of the cylinder-and-piston 21, 23 and close to the respective opposite circumferential ends of the wear shoe. The lug 35 has opposite legs which present oppositely inclined side faces 37 and 38 sloping toward the brake disc in opposite circumferential directions. The opposite legs of the V-shaped lug 35 are welded to the back of the backing plate 34, as best seen in FIG. 5. The respective lines of intersection 39 and 40 between the lug faces 37, 38 and the backing plate 34 extend vertically and parallel to a centerline C (FIG. 5) passing midway between the opposite circumferential ends of the wear shoe and radially through the axis of rotation of the brake disc. This is also true of the apex 35a of lug 35 at the intersection of its opposite legs. In one practical embodiment, each of the lug side faces 37, 38 extends at an angle of 65° with respect to the major face of the brake disc and at 25° to the axis of the cylinder-and-piston 21, 23.

The other lug 36 has similarly inclined side faces 41 and 42.

The housing limb 17 presents a pair of tapered V-shaped recesses 43 and 44 which receive these lugs 35 and 36 on the wear shoe. The recess 43 presents a pair of oppositely inclined side faces 45 and 46 (FIG. 4) having the same slope as the respective side faces 37 and 38 of lug 35 in confronting relationship to the latter. Similarly, the recess 44 has a pair of oppositely inclined side faces 47 and 48 having the same slope as the respective side faces 41 and 42 of the lug 36 and in confronting relationship to the latter.

At its apex 35a the wear shoe lug 35 has a longitudinal slot 49 which is open at its radially inward, lower end, as best seen in FIG. 5. As shown in FIG. 4, a pin 50 extends through this slot 49 and carries a ball-shaped enlargement 51 on its inner end for engagement with the inside of the lug. A coil spring 52 is engaged under compression between the inner end face 53 of a recess 54 in the housing limb 17 and a generally cup-shaped member 55 which is retained on the outer end of the pin 50 by a washer 56. With this arrangement, the spring 52 biases the wear shoe 31 to its retracted position, shown in FIG. 4.

The other lug 36 on wear shoe 31 has a similar slot 57 for receiving a pin 58 (FIG. 4) with a lug-engaging ball 59 on its inner end. A similar coil spring 60 urges the pin 58 downward in FIG. 4, to bias the wear shoe to its retracted position.

When the wear shoe 31 becomes worn enough to require replacement, it may be removed by first unbolting the cover plate 10 from the housing and then pulling the wear shoe 31 radially outward and upward through the opening thus provided in the top of the housing. The replacement wear shoe can then be inserted radially inward down through this opening, with its lug faces 37, 38 and 41, 42 sliding down across the respective faces 45, 46 and 47, 48 of the recesses 43 and 44 in the housing limb 17 until the closed upper ends of the slots 49 and 57 in the wear shoe lugs engage the ball-shaped enlargements 51 and 59 on the respective pins 50 and 58 and force the latter against the urging of springs 52 and 60 to the position shown in FIG. 4.

FIGURE 4 shows the retracted position of the wear shoe 31 before the brake is engaged. In this position the lugs 35 and 36 on the wear shoe are snugly received in the respective recesses 43 and 44 in the housing limb 17, with the side faces 37, 38 of lug 35 abutting against the respective side faces 45, 46 of recess 43 in the housing limb and with the side faces 41, 42 of lug 36 abutting against the respective side faces 47, 48 of recess 44 in the housing limb.

Assuming that the brake disc 10 is rotating in the direction indicated by the arrow in FIG. 4, when the brake is to be applied the piston 23 forces the wear shoe 31 inwardly toward the brake disc. As the wear shoe engages the brake disc frictionaly, the rotating disc will tend to pull the wear shoe in the same direction circumferentially. When this happens the lug surfaces 38 and 42, which are inclined in this circumferential direction, slide over the respective confronting side faces 46 and 48 of the respective recesses 43 and 44 in the housing limb 17. Consequently, as the wear shoe moves axially inward it also can move generally circumferentially in the direction of disc rotation for self-energizing braking engagement with the brake disc. The slidably engaging surfaces 38, 46 and 42, 48 on the wear shoe lugs and the housing limb recesses sustain the braking torque, and because of their locations toward the opposite circumferential ends of the wear shoe they effectively prevent it from cocking or tilting. Thus, the braking force is sustained by the wear shoe not only at the center, where it is engaged by the piston 23, but also close to each circumferential end, where these surfaces on the wear shoe lugs and the housing limb recesses engage one another. Consequently, the braking force is applied substantially uniformly across the circumferential extent of the wear shoe, even though it is actuated by only a single, relatively small diameter piston.

Conversely, if the brake disc is rotating in the opposite direction, the lug surfaces 37 and 41, which are inclined in this circumferential direction, will slide over the adjacent surfaces 45 and 47 of the respective recesses 43 and 44 in the same manner.

Consequently, the wear shoe has a self-energizing braking action and is prevented from cocking or tilting for either rotational direction of the brake disc.

When the brake pedal is released the springs 52 and 60 will return the wear shoe 31 to its retracted position.

The opposite wear shoe 32 and the housing limb 18 preferably have the same lug-and-recess construction as just described for wear shoe 31 and housing limb 17, and this description will not be repeated. Corresponding elements of the lug-and-recess construction for wear shoe 32 are given the same reference numerals as those for wear shoe 31, but with a "prime" suffix added.

In the operation of this particular brake, both wear shoes 31 and 32 are actuated simultaneously in opposite axial directions into braking engagement with opposite sides of the brake disc, as already described in detail for wear shoe 31.

However, the present invention may also be embodied in a disc brake having an axially-fixed, frictional reaction pad at one side of the brake disc, with the brake disc itself being movable axially into engagement with this reaction pad in response to the actuation of an axially displaceable frictional wear shoe acting against the opposite side of the brake disc. In such case, only the latter wear shoe will cooperate with the housing for self-energizing operation in the manner described.

Accordingly, while a presently-preferred embodiment of this invention has been described in detail and illustrated in the accompanying drawings, it is to be understood that the present invention may be embodied in brake construction differing from the particular arrangement disclosed. For example, if desired, the brake may include a self-adjusting mechanism for each piston-operated wear shoe to insure that the wear shoe is retracted a predetermined distance after each application of the brake.

I claim:

1. In a disc brake having a rotatable brake disc, a stationary housing portion at one side of the brake disc, a frictional wear shoe movable toward said one side of the brake disc for frictional braking engagement with the latter, and brake-applying means acting between said housing and said wear shoe for forcing said wear shoe into frictional engagement with the brake disc, the improvement which comprises: said housing portion having a pair of recesses facing toward said one side of the brake disc and located respectively on opposite sides circumferentially of said brake-applying means, each of said recesses having a pair of circumferentially-spaced opposite side faces, and said wear shoe having a pair of lugs respectively received in said recesses between said side faces thereof, each of said lugs having a pair of circumferentially-spaced opposite side faces in confronting relationship respectively to the side faces of the respective recess, each of said recesses and the respective lug having a pair of confronting side faces thereof in slidable engagement with each other and sloping toward the brake disc in the same direction circumferentially for self-energizing braking engagement of the wear shoe with the brake disc for disc rotation in said direction.

2. A disc brake according to claim 1, wherein said slidably-engaging side faces of each recess and the respective lug extend at substantially 65° to said brake disc.

3. A disc brake according to claim 1, wherein each lug has a slot at its outer end away from the brake disc, and further comprising a respective rod extending through each of said lug slots and having an enlarged inner end engaging behind the lug, and resilient means urging each rod away from the brake disc for retracting the wear shoe away from the brake disc.

4. A disc brake according to claim 1, wherein the remaining side faces of each recess and the respective lug are slidably engageable with each other and slope toward the brake disc in the opposite circumferential direction for self-energizing braking engagement of the wear shoe with the brake disc for disc rotation in said opposite direction.

5. A disc brake according to claim 4, wherein said opposite side faces of each recess and said opposite side faces of each lug extend at opposite angles of substantially 65 degrees to said one side of the brake disc.

6. A disc brake according to claim 4, wherein said brake-applying means comprises a single cylinder positioned on said housing portion substantially midway circumferentially between said recesses, and a piston slidable in said cylinder toward the brake disc and slidably abutting against the wear shoe.

7. A disc brake according to claim 4, wherein each of said lugs is generally V-shaped, having a pair of opposite legs which provide said opposite side faces of the lug and which intersect at an apex disposed away from the brake disc, and each lug has a downwardly-facing open ended slot in its apex, and further comprising a respective rod extending through each of said lug slots and having an enlarged inner end engaging inside the apex of the respective lug, and spring means acting between said housing portion and each rod and urging the respective rod away from the brake disc for retracting the wear shoe away from the brake disc.

References Cited
UNITED STATES PATENTS

| | | | |
|---|---|---|---|
| 2,981,376 | 4/1961 | Zeidler | 188—73 |
| 3,047,098 | 7/1962 | Olley | 188—73 |

FOREIGN PATENTS 960,036  6/1964  Great Britain.

FERGUS S. MIDDLETON, *Primary Examiner.*

GEORGE HALVOSA, *Examiner.*